United States Patent
Doshi et al.

(10) Patent No.: US 11,968,541 B2
(45) Date of Patent: Apr. 23, 2024

(54) SPECTRUM SHARING WITH DEEP REINFORCEMENT LEARNING (RL)

(71) Applicant: QUALCOMM Incorporated, San Diego, CA (US)

(72) Inventors: Akash Sandeep Doshi, Austin, TX (US); Srinivas Yerramalli, San Diego, CA (US); Lorenzo Ferrari, Oakland, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 17/463,053

(22) Filed: Aug. 31, 2021

(65) Prior Publication Data
US 2022/0078626 A1 Mar. 10, 2022

Related U.S. Application Data

(60) Provisional application No. 63/075,732, filed on Sep. 8, 2020.

(51) Int. Cl.
*H04W 16/14* (2009.01)
*G06N 3/006* (2023.01)
(Continued)

(52) U.S. Cl.
CPC ............ *H04W 16/14* (2013.01); *G06N 3/006* (2013.01); *G06N 3/045* (2023.01); *G06N 3/08* (2013.01); *G06N 3/088* (2013.01); *H04W 24/08* (2013.01)

(58) Field of Classification Search
CPC . H04W 72/0446; H04W 24/10; H04W 72/04; H04W 84/18; H04W 24/08;
(Continued)

(56) References Cited

U.S. PATENT DOCUMENTS

2016/0150442 A1* 5/2016 Kwan ................... H04W 24/08 455/453
2016/0360419 A1* 12/2016 Zapanta ................ H04W 24/10
(Continued)

FOREIGN PATENT DOCUMENTS

CN        108271163 A  *  7/2018  ............ H04W 16/14
WO    WO-2013155941 A1 * 10/2013  ............ H04W 16/06
(Continued)

OTHER PUBLICATIONS

Stallings, Data and Computer Communications, 2014, Tenth Edition, p. 104 and 329, (Year: 2014).*

*Primary Examiner* — Ricardo H Castaneyra
*Assistant Examiner* — Bradley D Lytle, Jr.
(74) *Attorney, Agent, or Firm* — QUALCOMM Incorporated

(57) ABSTRACT

A method of wireless communication performed by a first transmission device includes determining a set of spectrum sharing parameters based on sensing performed during a sensing period of a current time slot in a fixed contention based spectrum sharing system. The first transmission device shares a spectrum with a second transmission device. The method also includes determining, at a first artificial neural network of the first transmission device, a transmission device action, and/or a transmission parameter in response to receiving the set of spectrum sharing parameters. The method further includes transmitting, from the first transmission device, to a first receiving device during a data transmission phase of the current time slot based on the transmission device action and/or the transmission parameter.

24 Claims, 10 Drawing Sheets

(51) Int. Cl.
*G06N 3/045* (2023.01)
*G06N 3/08* (2023.01)
*G06N 3/088* (2023.01)
*H04W 24/08* (2009.01)

(58) Field of Classification Search
CPC ....... H04W 4/70; H04W 56/00; H04W 28/02; H04W 52/20; H04W 24/02; H04W 72/12; H04W 92/18; H04W 8/24; H04B 7/0413; H04B 17/318; H04B 5/0031; H04B 7/0417; H04B 17/309; G06N 3/04; G06N 3/0409; G06N 3/0418; G06N 3/02; G06N 3/03; G06N 3/045; G06N 3/08
See application file for complete search history.

(56) References Cited

U.S. PATENT DOCUMENTS

| | | | | |
|---|---|---|---|---|
| 2019/0075014 A1* | 3/2019 | Zhou | ................ | H04W 74/0833 |
| 2019/0281475 A1* | 9/2019 | Damnjanovic | ....... | H04W 24/02 |
| 2021/0326695 A1* | 10/2021 | Vitebsky | ................ | G06N 3/044 |

FOREIGN PATENT DOCUMENTS

| | | | | |
|---|---|---|---|---|
| WO | WO-2020068127 A1 * | 4/2020 | ........... | G06K 9/6262 |
| WO | WO-2020152389 A1 * | 7/2020 | ............ | H04W 72/27 |

* cited by examiner

SPECTRUM SHARING WITH DEEP REINFORCEMENT LEARNING (RL)

CROSS-REFERENCE TO RELATED APPLICATION

The present application claims the benefit of U.S. Provisional Patent Application No. 63/075,732, filed on Sep. 8, 2020, and titled "SPECTRUM SHARING WITH DEEP REINFORCEMENT LEARNING (RL)," the disclosure of which is expressly incorporated by reference in its entirety.

FIELD OF THE DISCLOSURE

Aspects of the present disclosure generally relate to wireless communications, and more particularly to techniques and apparatuses for spectrum sharing with deep reinforcement learning (RL).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (FORM) with a cyclic prefix (CP) (CP-FORM) on the downlink (DL), using CP-FORM and/or SC-FDM (e.g., also known as discrete Fourier transform spread FORM (DFT-s-FORM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method of wireless communication performed by a first transmission device includes determining, by the first transmission device, a set of spectrum sharing parameters based on sensing performed during one or more sensing periods of a current time slot in a fixed contention based spectrum sharing system. The first transmission device shares a spectrum with a second transmission device. The method also includes determining, at a first artificial neural network of the first transmission device, a transmission device action and/or a transmission parameter in response to receiving the set of spectrum sharing parameters. The method further includes transmitting, from the first transmission device, to a first of multiple receiving devices during a data transmission phase of the current time slot based on the transmission device action and/or the transmission parameter.

Other aspects of the present disclosure are directed to an apparatus for wireless communications performed by a first transmission device having a processor, and memory coupled with the processor. The processor is configured to determine, by the first transmission device, a set of spectrum sharing parameters based on sensing performed during one or more sensing periods of a current time slot in a fixed contention based spectrum sharing system. The first transmission device shares a spectrum with a second transmission device. The processor is further configured to determine, at a first artificial neural network of the first transmission device, one or more of a transmission device action or a transmission parameter in response to receiving the set of spectrum sharing parameters. The processor is further configured to transmit to a first of multiple receiving devices during a data transmission phase of the current time slot based on the transmission device action and/or the transmission parameter.

Other aspects of the present disclosure are directed to a first transmission device including means for determining, by the first transmission device, a set of spectrum sharing parameters based on sensing performed during one or more sensing periods of a current time slot in a fixed contention based spectrum sharing system. The first transmission device shares a spectrum with a second transmission device. The transmission device also includes means for determining, at a first artificial neural network of the first transmission device, a transmission device action and/or a transmission parameter in response to receiving the set of spectrum sharing parameters. The transmission device further includes means for transmitting, from the first transmission device, to a first of multiple receiving devices during a data transmission phase of the current time slot based on the transmission device action and/or the transmission parameter.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
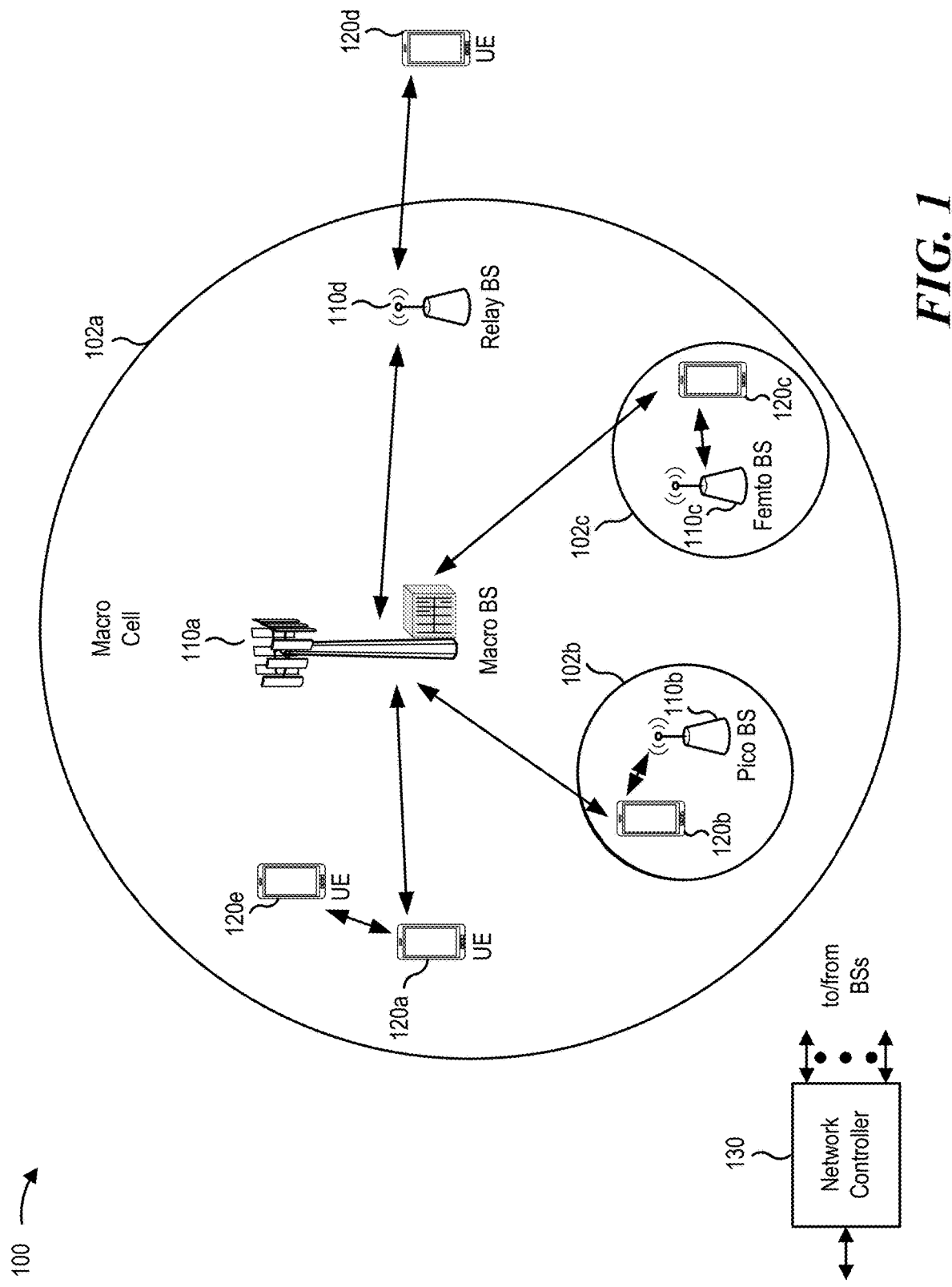
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Spectrum sharing for communication systems, such as long-term evolution (LTE), new radio-unlicensed (NR-U), and Wi-Fi, may include a sensing operation, a receiver confirmation operation, and/or a transmit operation. For ease of explanation, the current disclosure will discuss NR-U spectrum sharing but the disclosure is not so limited. In most scenarios, the sensing operation determines whether a transmission device, such as a base station, should initiate a transmission. The sensing operation may be performed during a contention window (CW). Before transmitting, the transmission device may (randomly) select a countdown number based on a size of the contention window. For example, if the contention window size is fifteen, the transmission device may randomly select any number between one and fifteen, or zero and fourteen, as the countdown number. The selected countdown number corresponds to a wait time before the transmission to a receiving device, such as a user equipment (UE). Each counter number within the contention window size may correspond to a transmission time. The transmission device senses a medium (e.g., the medium corresponding to the time slot) for a specific waveform signature. Additionally, or alternatively, the transmission device senses the medium to determine if energy detected in the medium is greater than a threshold of if the medium is clear. If the medium is clear, the transmission device waits until the selected countdown number is counted down to zero (e.g., decremented from the countdown number to zero) before the transmission occurs.

It may be desirable to improve transmitter sensing that is not reliant on receiver feedback. Aspects of the present disclosure are directed to a deep neural network reinforcement learning approach that uses receiver link quality information to improve transmitter sensing. In some configurations, an artificial neural network is trained to provide a transmission decision (e.g., transmit or do not transmit) and/or one or more transmission parameters for a transmission device. The artificial neural network may be trained based on reinforcement learning. That is, the artificial neural network may include a reward model trained to maximize reward. In some configurations, the reward model maximizes a rate for serving each receiving device. The serving rate may be aggregated across each transmission device that is sharing a spectrum. The reward model may also be referred to as a reward function. The artificial neural network may be a deep neural network (DNN) and/or a neural network. Aspects of the present disclosure are not limited to maximizing a reward via an artificial neural network. Other types of functions and/or models may be used to implement a reward function.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB)).

As indicated above, FIG. 1 is provided merely as an example. Other examples may differ from what is described with regard to FIG. 1.

Figure 2:
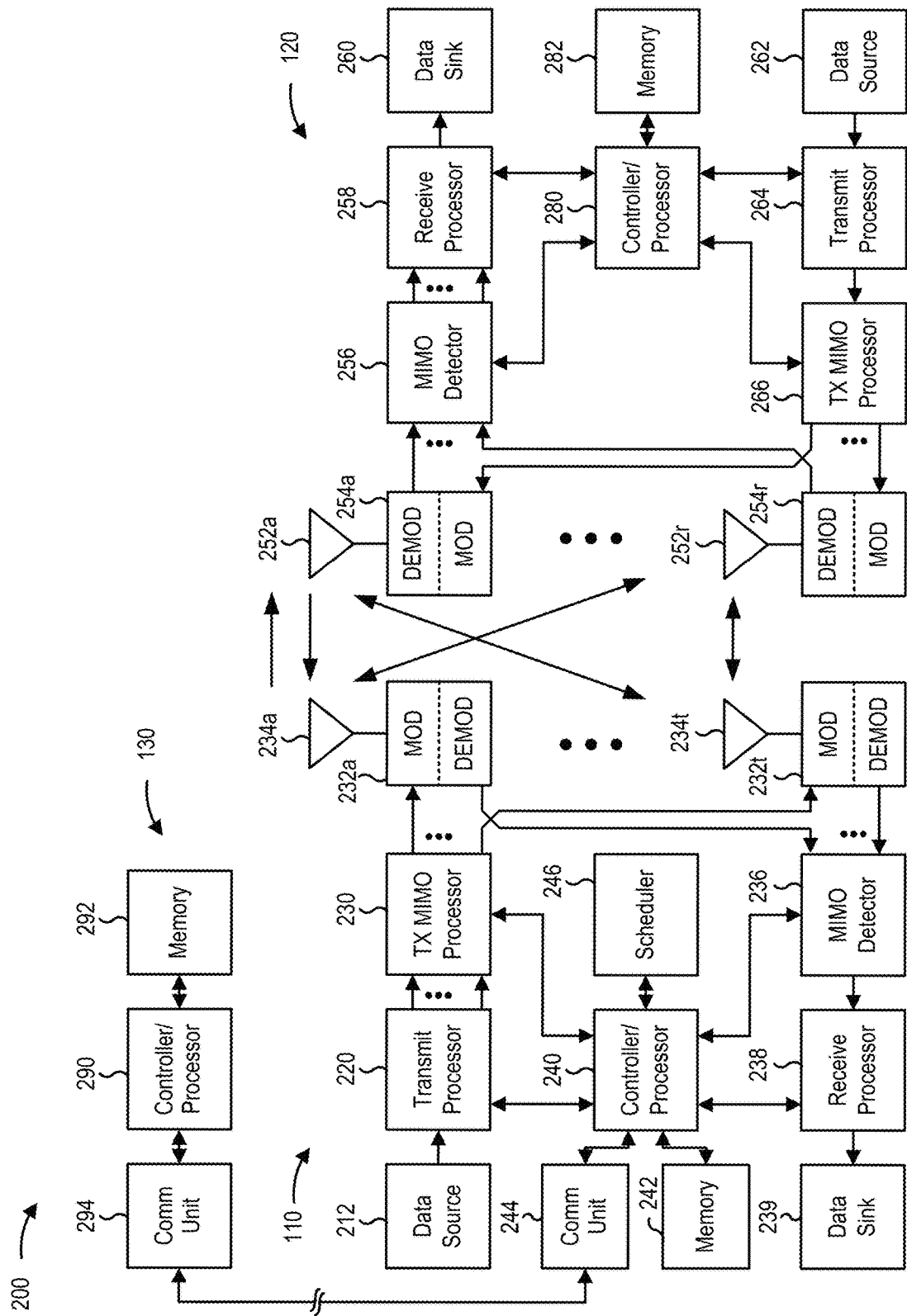
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for FORM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for FORM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-FORM, CP-FORM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with reinforcement learning for spectrum sharing as described in more detail elsewhere. For example, the controller/processor 240 of the base station 110, the controller/processor 280 of the UE 120, and/or any other component(s) of FIG. 2 may perform or direct operations of, for example, the processes of FIG. 9 and/or other processes as described. Memories 242 and 282 may store data and program codes for the base station 110 and UE 120, respectively. A scheduler 246 may schedule UEs for data transmission on the downlink and/or uplink.

In some aspects, the transmission device, such a base station 110, may include means for determining a set of spectrum sharing parameters based on sensing performed during a sensing period of a current time slot in a fixed contention based spectrum sharing system; means for determining one or more of a transmission device action or a transmission parameter in response to receiving the set of spectrum sharing parameters; and means for transmitting to a first receiving device during a data transmission phase of the current time slot based on at least one of the transmission device action or the transmission parameter. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
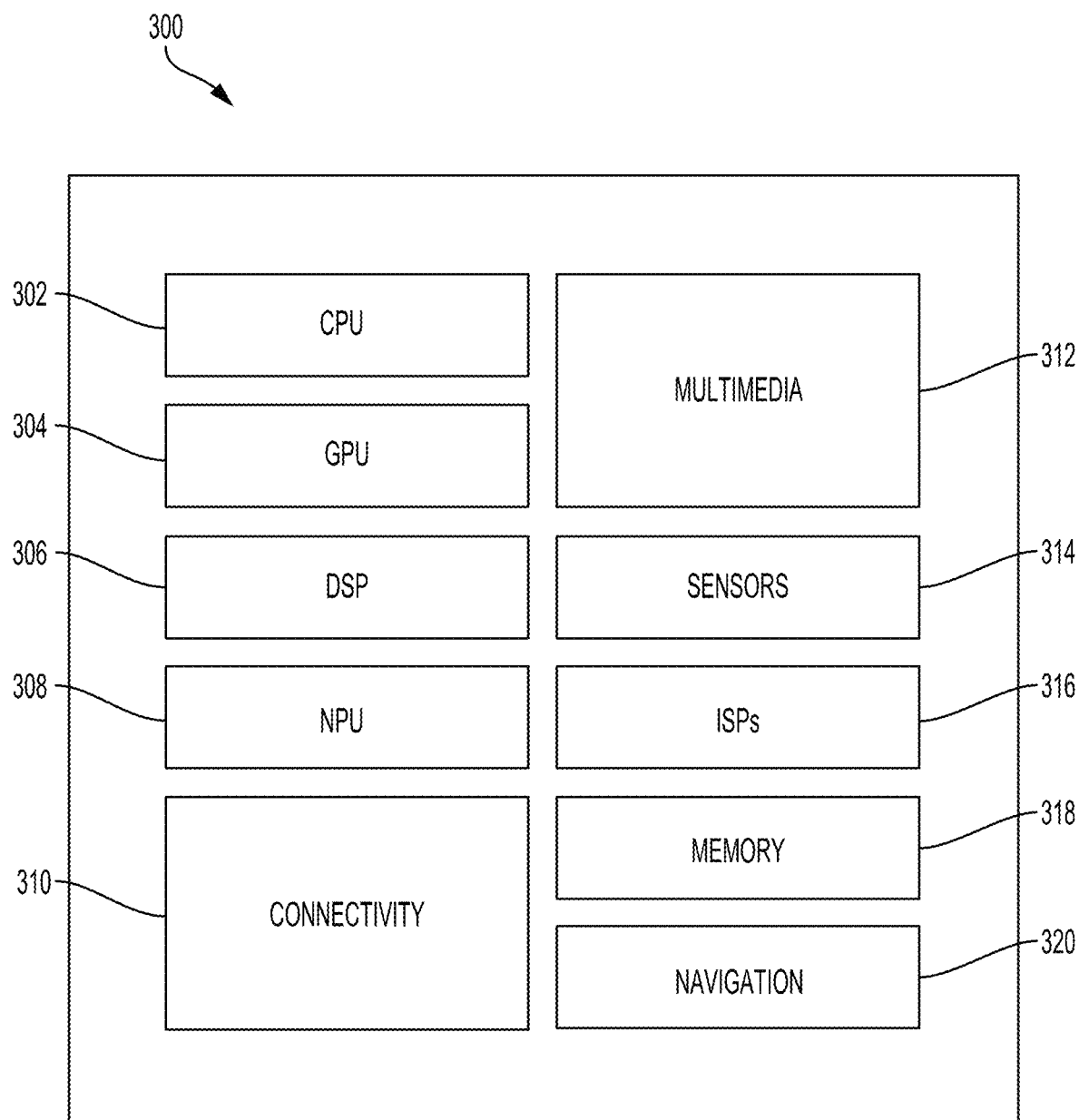
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for spectrum sharing, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In aspects of the present disclosure, the instructions loaded into the general-purpose processor 302 may comprise code to determine a set of spectrum sharing parameters based on sensing performed during at least a sensing period of a current time slot in a fixed contention based spectrum sharing system; code to determine one or more of a transmission device action or a transmission parameter in response to receiving the set of spectrum sharing parameters; and code to transmit to a first receiving device during a data transmission phase of the current time slot based on at least one of the transmission device action or the transmission parameter.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
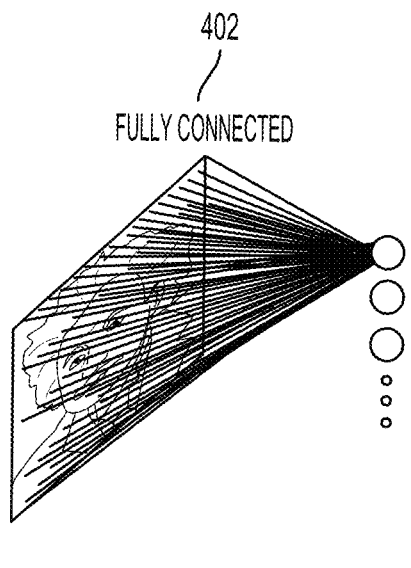
FIGS. 4A, 4B, and 4C are diagrams illustrating a neural network, in accordance with aspects of the present disclosure.
Figure 4B:
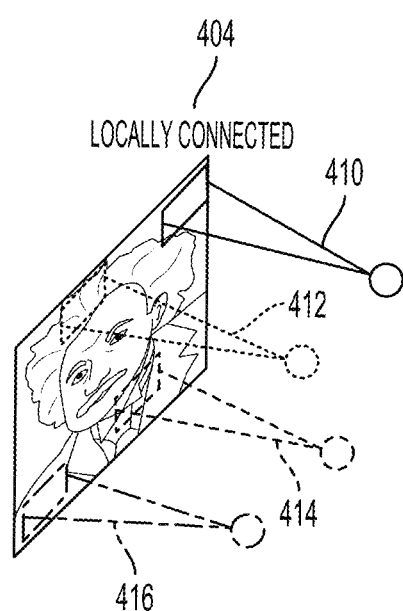

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
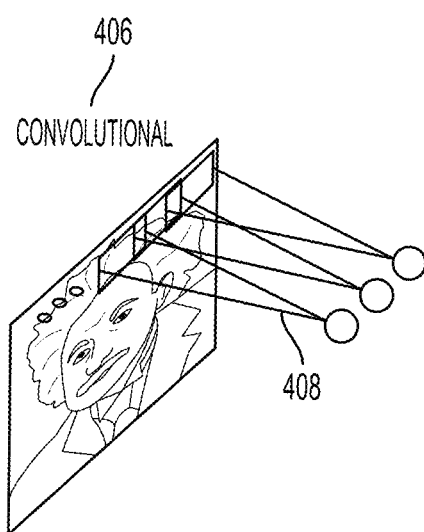

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
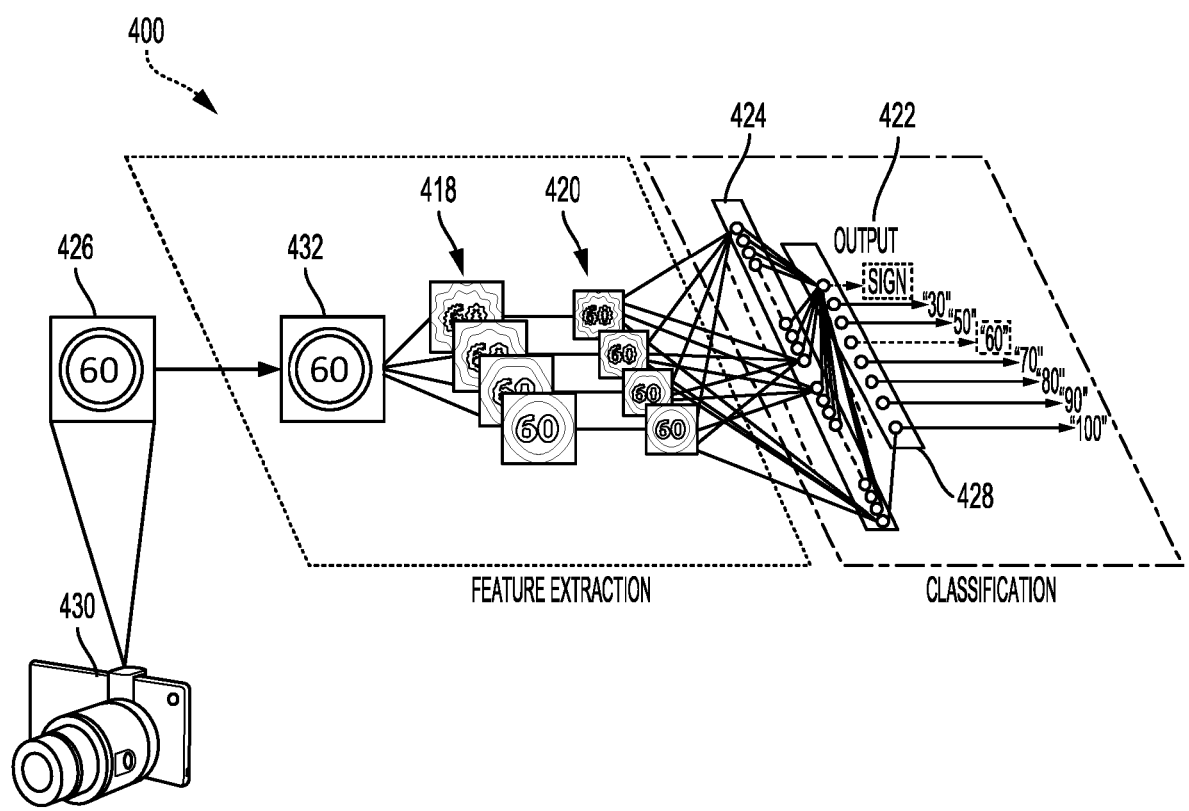
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
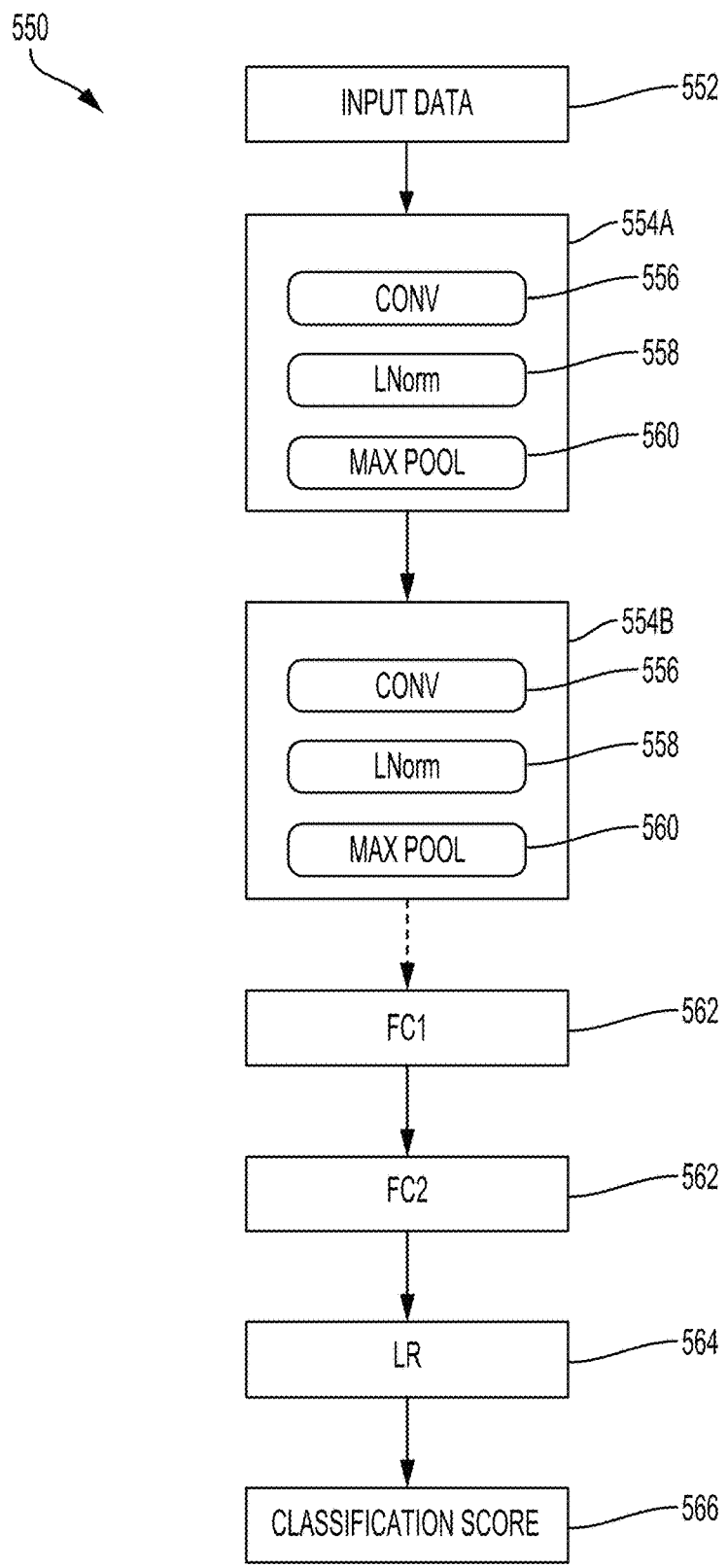
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 556, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

Learning functions for a machine learning apparatus (e.g., artificial neural network) may be generally classified into supervised learning, unsupervised learning, and reinforcement learning. Reinforcement learning is a method, which learns decisions, classifications, and actions. That is, reinforcement learning may learn to take an appropriate action in an environment by learning to maximize a reward to be obtained in the future. Aspects of the present disclosure are directed to selecting an action, which may influence an average rate for served UEs.

Q learning is a method of learning a value Q(s, a) for selecting an action a under a current state s. That is, an action a with the highest value Q(s, a) may be selected as the optimal action in a certain state s. However, with respect to the combination of a state s and action a, the true value of the value Q(s, a) may not be initially known. Then, an agent (action subject) selects various actions a under a certain state s, and receives rewards for actions a at the time. In this way, the agent learns selection of better action, e.g., a true value Q(s, a). Furthermore, as described below, a total of the rewards to be obtained over the future is intended to maximize as a result of action.

As indicated above, FIGS. 3-5 are provided as examples. Other examples may differ from what is described with respect to FIGS. 3-5.

As described, spectrum sharing for communication systems, such as long-term evolution (LTE), new radio-unlicensed (NR-U), and Wi-Fi, may include a sensing operation, a receiver confirmation operation, and/or a transmit operation. For ease of explanation, the current disclosure will discuss NR-U spectrum sharing.

NR-U devices may adhere to listen-before-talk (LBT) specifications for channel access. Network access in an unlicensed spectrum may be referred to as licensed-assisted access (LAA). An LBT licensed-assisted access (LAA) device may perform a clear channel assessment (CCA) check using detected energy, where the channel is considered clear only if the energy level in the channel is less than a CCA threshold for a duration of an observation time. If the channel is deemed clear, the device may transmit data for a period equal to a channel occupancy time (COT) before repeating the clear channel assessment procedure.

Figure 6:
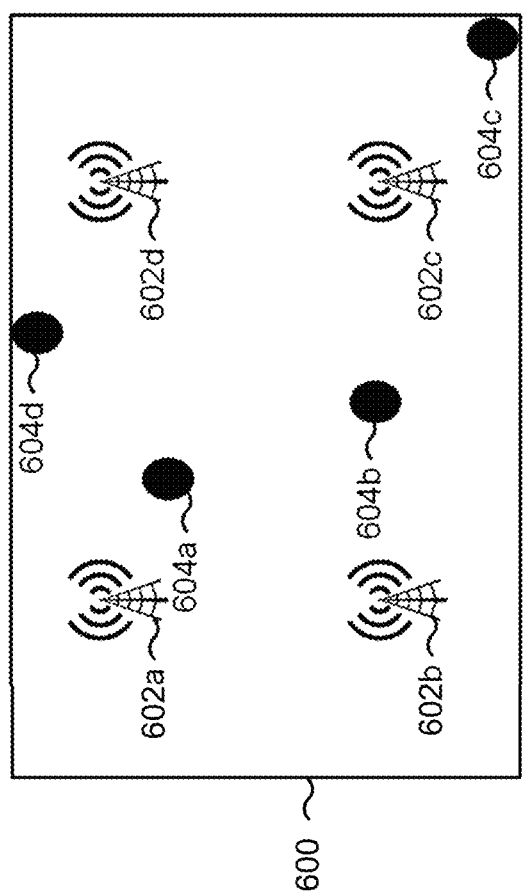
FIG. 6 is a diagram illustrating an example of a layout for a fixed deployment, in accordance with aspects of the present disclosure.

Aspects of the present disclosure consider a fixed deployment for transmission devices, such as base stations, associated with a single operator. FIG. 6 is a diagram illustrating an example of a layout 600 for a fixed deployment, in accordance with aspects of the present disclosure. In the example of FIG. 6, multiple transmission devices 602a, 602b, 602c, 602d are deployed in an environment where the transmission devices 602a, 602b, 602c, 602d are associated with a single operator. In the current example, each transmission device 602a, 602b, 602c, 602d serves a different receiving device 604a, 604b, 604c, 604d. Aspects of the present disclosure are not limited to each transmission device 602a, 602b, 602c, 602d serving one receiving device 604a, 604b, 604c, 604d. Each transmission device 602a, 602b, 602c, 602d may serve multiple receiving devices. In one configuration, the transmission devices 602a, 602b, 602c, 602d are examples of base stations 110 described with reference to FIG. 1, and the receiving devices 604a, 604b, 604c, 604d are examples of UEs 120 described with reference to FIG. 1.

In the example of FIG. 6, at each time slot, each transmission device 602a, 602b, 602c, 602d determines which receiving device 604a, 604b, 604c, 604d to service and a transmission power level. In the current disclosure, it is assumed the receiving devices 604a, 604b, 604c, 604d are scheduled to receive in all time slots. Additionally, a full buffer traffic model is assumed, such that a transmission device 602a, 602b, 602c, 602d always has traffic to be delivered to another receiving device 604a, 604b, 604c, 604d. Thus, each transmission device 602a, 602b, 602c, 602d may participate in the contention process (e.g., sensing operation).

Figure 7:
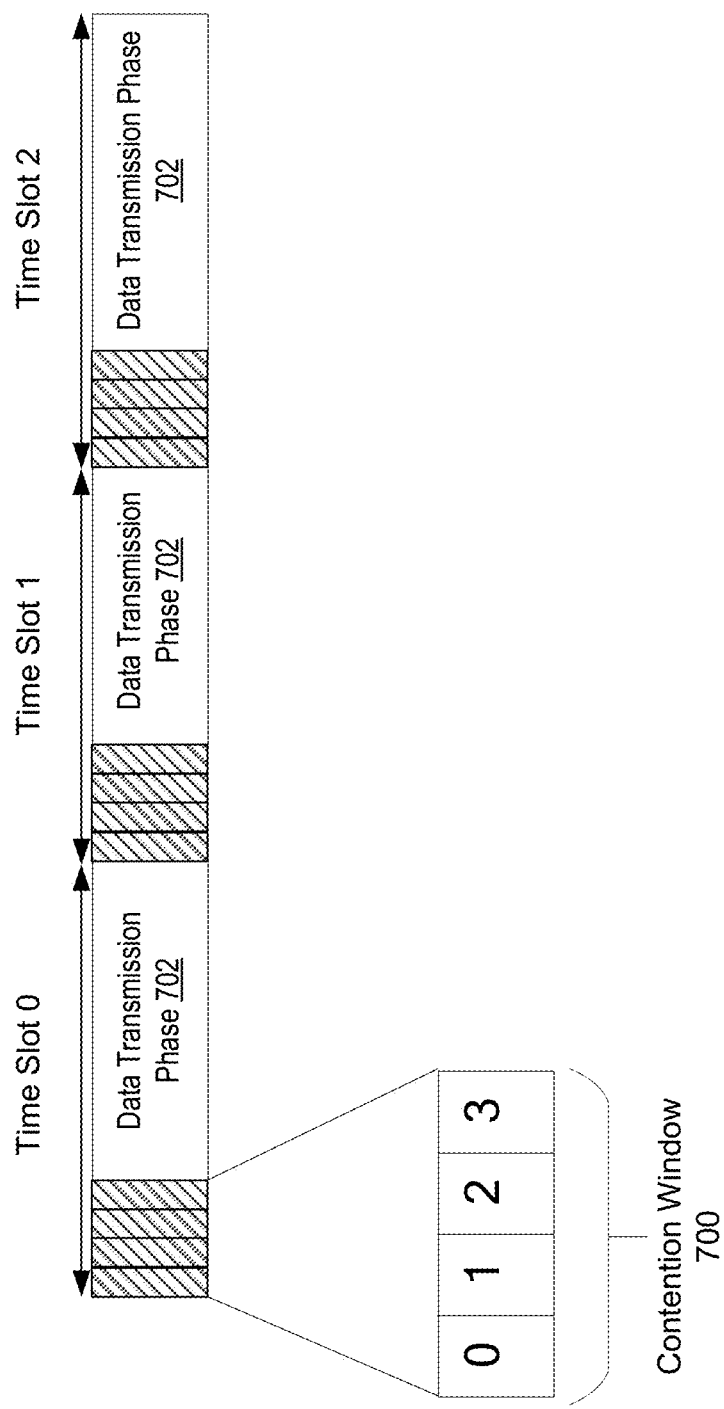
FIG. 7 is a diagram illustrating an example of a contention window and a data transmission phase of a time slot, in accordance with aspects of the present disclosure.

In most scenarios, a transmission device performs a sensing operation to determine an energy level of a time slot. The sensing operation may be performed during a contention window (CW). FIG. 7 is a diagram illustrating an example of a contention window 700 and a data transmission phase 702 of each time slot of a number of consecutive time slots (shown as Time Slot 0, Time Slot 1, and Time Slot 2), in accordance with aspects of the present disclosure. Before transmitting, a transmission device, such as one of the transmission devices 602a, 602b, 602c, 602d described with reference to FIG. 6, may (randomly) select a countdown number at a start of the time slot based on a size of the contention window 700. For ease of explanation, it is assumed each transmission device selects a unique counter such that there is no collision among transmission devices in the contention process. Additionally, in the example of FIG. 7, a length of the contention window 700 is equal to a number of transmission devices. Following the example of FIG. 6, which described four transmission devices 602a, 602b, 602c, 602d, the contention window 700 includes four counter slots (shown as 0, 1, 2, 3). In this example, the transmission device may randomly select any number between zero and three as the countdown number, where the selected countdown number corresponds to a wait time before the transmission to a receiving device, such as a UE. Each counter number within the contention window corresponds to a different transmission time. The countdown number selected by each transmission device may be decremented after each transmission decision at a current counter number, beginning with counter number zero.

When the selected counter expires (e.g., decremented from the countdown number to zero), the transmission device determines if the channel is clear. That is, the transmission device may perform a sensing operation to identify a specific waveform signature. Additionally, or alternatively, the transmission device performs a sensing operation to determine if a detected energy in the channel is greater than an energy threshold. For example, a Wi-Fi device may perform sensing on the channel to determine an energy and detect a waveform signature. As another example, an NR-U device may perform sensing on the channel to determine the energy. The transmission may be a data transmission or a packet to initiate transmission with a receiver confirmation, such as request-to-send (RTS) or equivalent, or a clear-to-send-to self (CTS2self) packet.

As described, at the expiration of a counter number, the transmission device corresponding to the counter number may determine whether to transmit. If the transmission device transmits, the transmission continues through the contention window 700 and in the data transmission phase 702. The process may then repeat at a subsequent time slot. Each transmission device may be specified to maximize a long-term throughput (or other metrics such as packet latency, reliability, etc.) observed by a receiving device (e.g., served device), such as a UE.

In some scenarios, a receiving device performs a confirmation operation, which may be optional. In these scenarios, the intended receiving device(s) may measure a quality of the received signal. For example, the receiving device may determine if a signal to interference plus noise ratio (SINR) is greater than a threshold. Additionally, or alternatively, the receiving device(s) may verify that it is allowed to receive and/or transmit a signal. If the quality of the received signal is greater than a threshold and/or if the receiving device is allowed to receive a signal, the receiving device may transmit a confirmation to the transmitting node, such as a clear-to-send (CTS) signal in WiFi or equivalent signals defined in other systems. The transmission device may initiate the data transmission in response to the confirmation. Alternatively, the transmission device initiates the transmission after performing the sensing operation. In this example, the confirmation operation may be skipped.

For some scenarios, a transmission device, such as a sub-7 GHz device, only performs a sensing operation to determine whether a transmission should be initiated. The sensing operation does not consider the quality of a received signal at the receiving device. Furthermore, as described, some transmission devices may transmit when a detected energy is greater than an energy threshold. The energy threshold may not adapt to varying path gains caused by fading, varying receiving device positions, and mobility. As described, in some scenarios, the sensing operation is augmented with a receiver confirmation operation, which may further increase network overhead. That is, the receiver-based confirmations may reduce overall system throughput, though they may benefit by increasing throughput (or SINR/reliability) on a given link.

Thus, it may be desirable to improve a transmission sensing operation to consider reception quality at the receiving device while reducing network overhead. Aspects of the present disclosure are directed to a deep neural network reinforcement learning approach to improve transmission sensing with receive link quality information.

In some deployments, a transmission device (e.g., gNB) may only have partial access to the parameters of a receiving device. In addition, the transmission device may not directly observe the action of all neighboring transmission devices, thus providing the transmission device with only a partial observation of the system state. In several scenarios, a central controller is not specified to determine an action of each transmission device. Thus, channel access may be characterized as a decentralized partially observable Markov decision process (DEC-POMDP).

Assuming full buffer traffic for a transmission device, at any given time, a transmission device can either be transmitting data or waiting in the contention queue. Thus, each transmission device may be in one of two states. For example, the transmission device may be in a data transmission state (which remains until the end of the time slot) or the contention state. In some configurations, each state may be defined in accordance with the information available to the transmission device in each time slot. A reward structure may be associated with each state transition, such that maximization of the sum of the rewards accumulated over time provides for long term proportional fairness (PF) of the throughput delivered to all receiving devices.

In some configurations, an artificial neural network is trained to provide a transmission decision (e.g., transmit or do not transmit) and/or one or more transmission parameters for a transmission device. The artificial neural network may be trained based on reinforcement learning. That is, the artificial neural network may include a reward model trained to maximize reward. In some configurations, the reward model maximizes a rate for serving each receiving device. The serving rate may be aggregated across each transmission device that is sharing spectrum. The reward model may also be referred to as a reward function. The artificial neural network may be a deep neural network (DNN) and/or a neural network. Aspects of the present disclosure are not limited to maximizing a reward via an artificial neural network. Other types of functions and/or models may be used to implement a reward function.

According to aspects of the present disclosure, the artificial neural network receives one or more inputs from a transmission device. The input may include one or more of the inputs described below, in addition to other inputs. For example, the input may include a total energy observed during a contention window of one or more previous time slots (e.g., M previous time slots) as well as a current time slot. In the current time slot, the transmission device (e.g., energy observing transmission device) observes an energy of transmission devices scheduled to transmit before a scheduled transmission slot of the energy observing transmission device. Additionally, or alternatively, the input may include an energy observed from one or more specific transmission devices during a contention window of one or more previous time slots.

Additionally, or alternatively, the input may include an interference measurement (e.g., SINR), or signal quality, observed at a receiving device at one or more previous time slots (e.g., N previous time slots). The receiving device may provide the interference measurement after each received transmission. In some configurations, the interference measurement includes interference observed on a current time slot.

Additionally, or alternatively, the input may include a mean rate for serving the current receiving device over one or more previous time slots. Additionally, or alternatively, the input may include a mean rate at which one or more other transmission devices served their respective receiving devices over one or more previous time slots. Additionally, or alternatively, the input may include a mean rate with which other transmission devices served corresponding receiving devices over one or more previous time slots. The one or more previous time slots for determining the mean rate may be all previous time slots or a pre-defined number of time slots. Additionally, or alternatively, the input may include a selected counter value for the current time slots. Additionally, or alternatively, the input may include a compressed version of information, such as a total observed energy, a mean serving rate, and/or a signal quality, obtained from the one or more previous time slots.

Additionally, or alternatively, the input may include an estimate of a state of one or more other transmission devices associated with the same operator as the current transmission device. The estimates may include a counter value, data availability, and/or other estimates determined from information exchanged between the transmission devices as well as observations from one or more previous time slots.

In some configurations, the same neural network is deployed at each transmission device. For example, the transmission devices 602a, 602b, 602c, 602d described with reference to FIG. 6 may include the same neural network, where the neural network may be trained offline, and the same neural network is deployed in each transmission device 602a, 602b, 602c, 602d. In other configurations, each transmission device learns weights and parameters for a neural network deployed at the transmission device. In these configurations, the neural network may be trained (e.g., tuned) according to the transmission device's location in a layout. For example, a first neural network of a first transmission device 602a may be different from a second neural network of a second transmission device 602b. In other configurations, a neural network of each transmission device may share one or more common layers, such as feature extraction layers, with the neural networks of the other transmission devices.

Additionally, the neural network of each transmission device may include one or more layers tuned (e.g., optimized), such as decision layers, for the respective transmission device. For example, the first neural network of the first transmission device 602a may share one or more common layers with the second neural network of a second transmission device 602b. Furthermore, the first neural network may include one or more layers tuned specifically for the first transmission device 602a. Additionally, the second neural network may include one or more layers tuned specifically for the second transmission device 602b.

As described, aspects of the present disclosure train a reward model to maximize a serving rate of each receiving device. The serving rate may be a long term average serving rate. Furthermore, the maximized serving rate may be aggregated across all transmission devices.

In some configurations, the reward model captures a proportional fair metric with an exponentially smoothed average rate. The reward model may be formulated as a maximization of a utility function U( ), which is a sum of a log of an exponentially smoothed average serving rate observed by each receiving device. Specifically, the utility function U( ) may be defined as:

$$U(\overline{X}[L]) = \sum_{i=0}^{N-1} \log(\overline{X}_i[L]), \quad (1)$$

where $\overline{X}_i$ refers to the exponentially smoothed average serving rate observed by a receiving device i, L is an episode length, and 1/B is the smoothing coefficient, where B is greater than one and balances weights of previous and current transmission rates. N is the number of transmission devices. For each receiving device i, $\alpha_i \in \{0,1\}$ denotes an action vector a of actions (e.g., transmission device actions). The action may include transmitting to a receiving device (denoted by one) or refraining from transmitting (denoted by zero). For each receiving device i, $R_i$ is an observed data rate. The exponentially smoothed average rate $\overline{X}_i$ observed by a receiving device, may be defined as:

$$\log(\overline{X}_i[L]) = \log((1 - 1/B)\overline{X}_i[L-1] + (1/B)R_i[L]) = \quad (2)$$

$$\log\left((1 - 1/B)\overline{X}_i[L-1]\left(1 + \frac{R_i[L]}{(B-1)\overline{X}_i[L-1]}\right)\right) =$$

$$\log \overline{X}_i[0] + \sum_{t=1}^{L} \log\left((1 - 1/B)\left(+\frac{R_i[t]}{(B-1)\overline{X}_i[t-1]}\right)\right).$$

The utility function U( ) of EQUATION 1 is based on a number N of transmission devices. The utility function U( ) of EQUATION 1 may be decomposed to be a function of a number of time steps L (e.g., an episode length) as well as a number N of transmission devices. The decomposed utility function U( ) may be defined:

$$U(\overline{X}[L]) = \sum_{i=0}^{N-1} \log(\overline{X}_i[L]) = \sum_{t=1}^{L} \sum_{i=0}^{N-1} r_i[t] + \sum_{i=0}^{N-1} \log \overline{X}_i[0], \quad (3)$$

where $r_i[t]$ denotes a contribution of each receiving device, at the time step t, to the reward. The reward function for a receiving device i at time t may be defined as:

$$r_i[t] = \log\left((1 - 1/B)\left(1 + \frac{R_i[t]}{(B-1)\overline{X}_i[t-1]}\right)\right). \quad (4)$$

This reward function may be independent of a length of an episode. The episode refers to previous observations. In the current example, a length of an episode refers to a number of previous time slots. Thus, the reward function may be independent of the number of previous time slots L. For online updates (e.g., updates while the neural network is deployed), the reward for UE i at time t may be $r_{t,i}^f$, which may be based on a signal to interference plus noise ratio (SINR) and an average rate. Additionally, the reward for the receiving device i at time t may be independent of a frequency of an update f. In some configurations, the reward for the receiving device i at time t may be defined as:

$$r_i^f[t] = \log\left((1 - 1/B)\left(1 + \frac{R_i[t]}{(B-1)\overline{X}_i[t-1]}\right)\right). \quad (5)$$

According to aspects of the present disclosure, at each time step (e.g., each counter of a contention window), the neural network generates a decision for the transmission device based on the one or more inputs and the trained reward model. The output of the neural network may include a transmission device action (e.g., transmit or refrain from transmitting) and/or one or more transmission parameters. The transmission parameters may include the energy detection threshold for determining whether to transmit. As described, the transmission device may transmit if the sum of the energy sensed on a channel or a per transmission device energy is greater than the energy detection threshold. Additionally, or alternatively, the transmission parameters may include a modulation and coding scheme (MCS), precoding, transmit power, and/or other transmission parameters. Additionally, or alternatively, the transmission parameters may include intermediate parameters, such as an identity of a transmission device. Additionally, or alternatively, the transmission parameters may include an estimate of a transmission status and other contention parameters of the other transmission devices.

In some configurations, the neural network may generate a value associated with each potential action in an action space. Additionally, or alternatively, the neural network may generate a mean value of all actions and a difference with regards to each action. Furthermore, the neural network may be trained to directly output the best action or the probability with which a certain action may be taken. The actions of the current disclosure are not limited to transmitting and refraining from transmitting. Other actions are contemplated.

Figure 8:
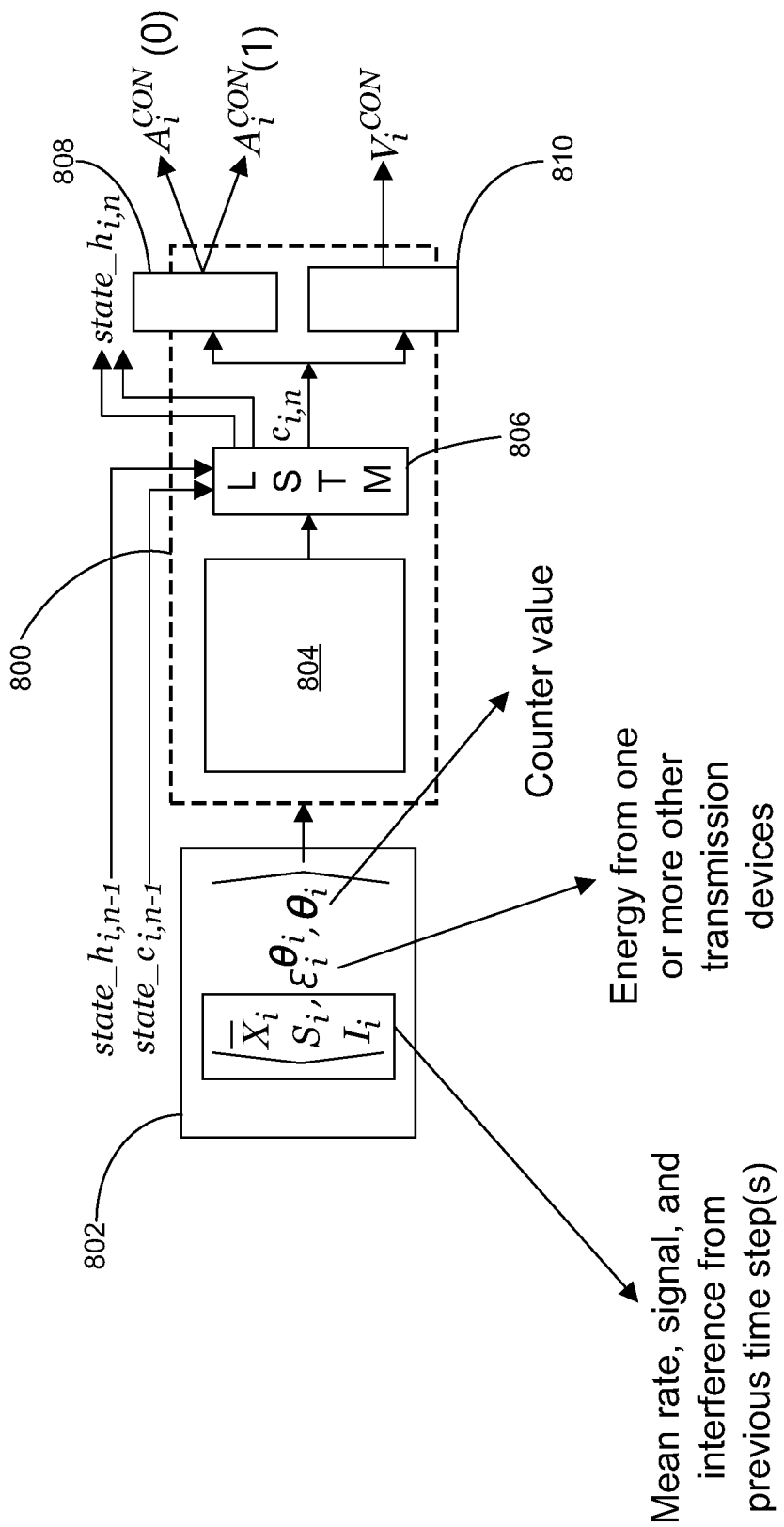
FIG. 8 is a block diagram illustrating an example of a reward model, in accordance with aspects of the present disclosure.

FIG. 8 is a block diagram illustrating an example of a reward model 800, in accordance with aspects of the present disclosure. In the example of FIG. 8, inputs 802 are provided to the reward model 800. In this example, the inputs 802 include, but are not limited to, a mean serving rate $\overline{X}_i$ of the transmission device over one or more previous time steps (e.g., time slots), a signal power $S_i$ measured over one or more previous time steps, and/or a total interference power $I_i$ measured over one or more previous time steps. The inputs 802 also include an energy sensed from one or more other transmission devices $\varepsilon_i^{\theta_i}$ and the counter value $\theta_i$ of the contention window.

The inputs 802 may be provided to a deep neural network (DNN) 804. The deep neural network 804 may be a two-layer deep neural network. In some configurations, the deep neural network 804 implements a tan h activation function. The output of the deep neural network 804 may be received at a long-short term memory (LSTM) layer 806. The LSTM layer 806 may generate a hidden state $h_{i,n}$ and cell state $c_{i,n}$. Additionally, the LSTM layer 806 may receive a hidden state $h_{i,n}$ and a cell state $c_{i,n-1}$ from a previous time-step. The hidden state $h_{i,n}$ and the cell state $c_{i,n}$ of the LSTM layer 806 of the current time step (n) may be input to an LSTM layer at a next time step (n+1). The process of receiving a hidden state $h_{i,n-1}$ and cell state $c_{i,n-1}$ of an LSTM layer of a previous time step (n−1) and providing the hidden state $h_{i,n}$ and cell state $c_{i,n}$ of an LSTM layer of a current time step (n) to an LSTM layer of a next time step (n+1) may be repeated for each time step. As such, the hidden state $h_{i,n}$ and cell state $c_{i,n}$ are compressed representations of a local observation history of the transmission device, such that a policy learned by the reward model 800 may be a mapping of a local observation history to an action space.

Additionally, as shown in FIG. 8, the LSTM layer 806 output is received at a first fully connected layer 808 and a second fully connected layer 810. The first fully connected layer 808 generates advantage values $A_i^{CON}(0)$ and $A_i^{CON}(1)$ for the contention window (CON). Each advantage value A corresponds to one of the possible actions a (e.g., transmit ($A_i^{CON}(1)$) or refrain from transmitting ($A_i^{CON}(0)$). Each advantage value A indicates an advantage for taking an action. Specifically, each advantage value is a gain in an expected cumulative reward of choosing an action a. The transmission device may select the action a with the greatest advantage A. The second fully connected layer 810 generates a mean value $V_i^{CON}$ of all actions a. The Q value (e.g., quality value) of an action may be determined based on the advantage A and the mean V. The Q value may be referred to as the reward of an action taken in a given state. In some configurations, the Q value is determined as follows:

$$Q_i(s, a) = V_i(s) - \frac{1}{|A_i|} - A_i(s, a), \quad (6)$$

where a is an action and s is an environment state.

The reinforcement learning function may be a multi-agent reinforcement learning function trained independently for each base station and deployed at each base station. In addition, the training may be carried out with some common blocks and neural network layers across the different base stations with the shared weights commonly updated during the training phase. Alternatively, the same neural network may be trained for use at all the base stations.

Furthermore, a neural network trained according to the previously specified configuration in an offline fashion may be refined online while in a deployment. The refinement of the network weights suited to a deployment may be performed independently for each base station or commonly for multiple base stations.

The neural network may be trained for a given layout, such as fixed transmission device locations and variable receiving device locations. In addition, the network may be trained on different configurations of transmit device locations. Aspects of the present disclosure improve a quality of transmissions by using link quality information at the transmission device without active receiving device participation in the contention process.

Figure 9:
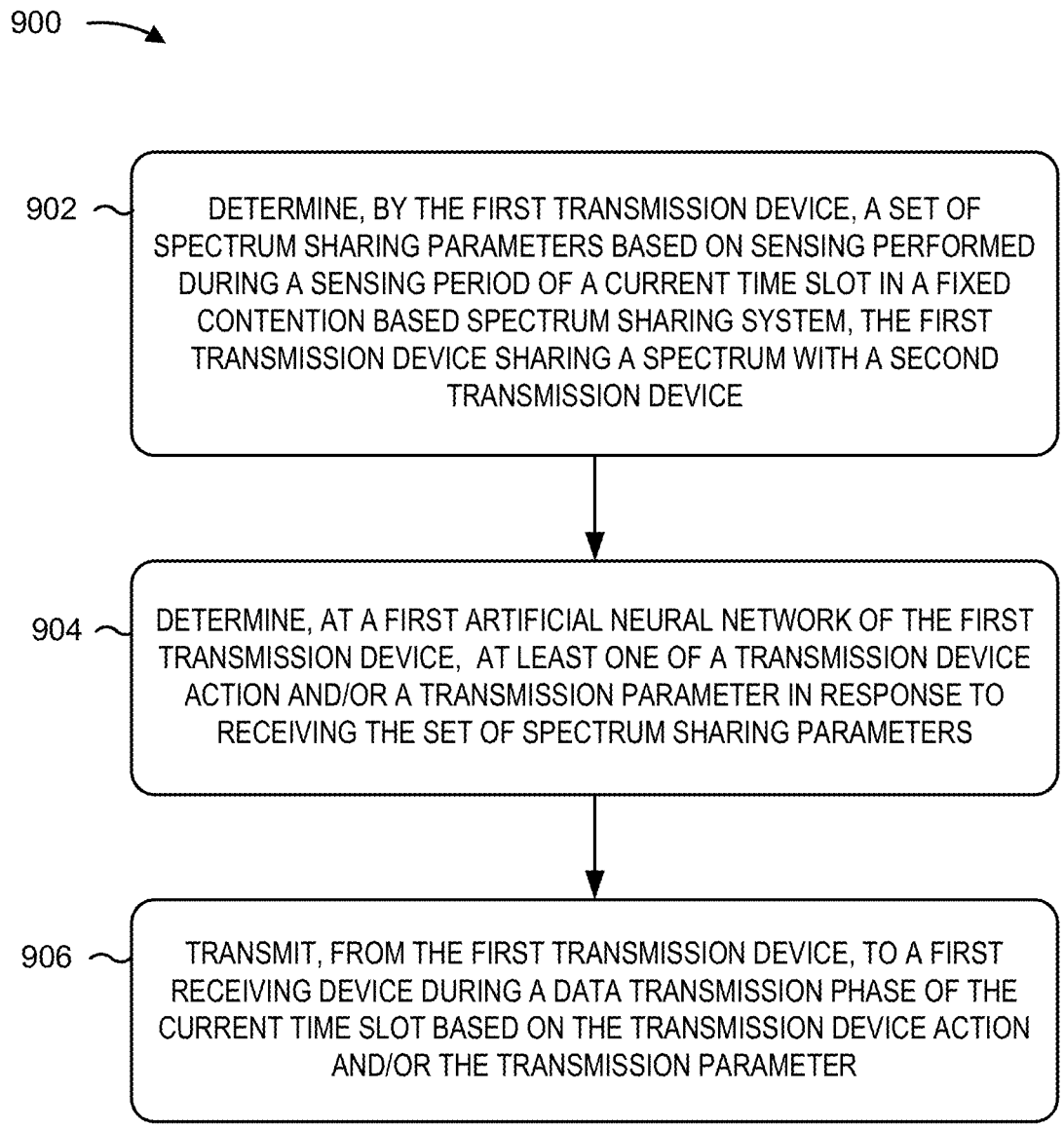
FIG. 9 is a flow diagram illustrating an example process performed, for example, by a transmission device, in accordance with various aspects of the present disclosure.

FIG. 9 is a flow diagram illustrating an example process 900 performed, for example, by a transmission device, in accordance with various aspects of the present disclosure. The example process 900 is an example of spectrum sharing with deep reinforcement learning (RL).

As shown in FIG. 9, in some aspects, the process 900 may include determining, by the first transmission device, a set of spectrum sharing parameters based on sensing performed during a sensing period of a current time slot in a fixed contention based spectrum sharing system. The first transmission device shares a spectrum with a second transmission device (block 902). For example, the first transmission device (e.g., using the antenna 252, DEMOD/MOD 254, MIMO detector 256, TX MIMO processor 266, receive processor 258, transmit processor 264, controller/processor 280, and/or memory 282) can determine, by the first transmission device, a set of spectrum sharing parameters based on sensing.

As an example, the spectrum sharing parameters may include one or more of a total energy observed in sensing periods of a first set of previous time slots, an observed energy from each interferer in the current time slot, an interference measurement of a second set of previous time slots, a first mean rate for serving the first receiving device in a third set of previous time slots, a second mean rate for serving a second receiving device by the first transmission device in the third set of previous time slots, a third mean rate used by the second transmission device for serving a third receiving device, a drawn counter value, compressed information obtained from the third set of previous time slots, and an estimated state of the second transmission device. In some configurations, the spectrum sharing parameters are determined based on sensing performed during a sensing period of a current time slot and/or one or more previous time slots. The sensing may be performed during a contention window, such as the contention window 700 described with reference to FIG. 7. In some examples, the transmission device detects an energy of other transmissions during the current contention window. As described above, the spectrum sharing parameters may be input to an artificial neural network.

As shown in FIG. 9, in some aspects, the process 900 may include determining, at a first artificial neural network of the first transmission device, at least one of a transmission device action or a transmission parameter in response to receiving the set of spectrum sharing parameters (block 904). For example, the first transmission device (e.g., using the antenna 252, DEMOD/MOD 254, MIMO detector 256, TX MIMO processor 266, receive processor 258, transmit processor 264, controller/processor 280, and/or memory 282) can determine, at a first artificial neural network of the first transmission device, a transmission device action and/or a transmission parameter.

In some configurations, the transmission device action may include transmitting to a receiving device during the data transmission phase or refraining from transmitting to the receiving device. Additionally, the transmission parameter may include an energy detection threshold for determining whether to transmit, a modulation and coding scheme, a transmission power, a precoding parameter, an identity of the second transmission device, an estimated state of the second transmission device, a value associated with each potential transmission device action, a mean value of all potential transmission device actions, and/or a difference for each potential action. The transmission device action and the transmission parameter may be determined by an artificial neural network (e.g., machine learning model), such as the reward model 800 described with reference to FIG. 8.

In some aspects, the process 900 may include transmitting, from the first transmission device, to a first receiving device during a data transmission phase of the current time slot based on the transmission device action and/or the transmission parameter (block 906). For example, the first transmission device (e.g., using the antenna 252, DEMOD/MOD 254, TX MIMO processor 266, transmit processor 264, controller/processor 280, and/or memory 282) can transmit during a data transmission phase of the current time slot based on the transmission device action and/or the transmission parameter. In some configurations, the artificial neural network, such as the reward model 800 described with reference to FIG. 8, determines the transmission device action and/or the transmission parameter by maximizing the reward of a reward function. As an example, the artificial neural network may determine that transmitting at the current time slot may maximize the reward. Therefore, a reward value for transmitting may be greater than a reward value for refraining from transmitting. In response, the transmission device may transmit during the data transmission phase of the current time slot based on the reward values corresponding to the transmission device action. As another example, the artificial neural network may determine that one or more transmission parameters, such as a transmission power, may maximize the reward. Therefore, the artificial neural network of the transmission device may perform a transmission according to the one or more transmission parameters that maximize the reward.

Implementation examples are described in the following numbered clauses.

1. A method of wireless communication performed by a first transmission device, comprising:
    determining, by the first transmission device, a set of spectrum sharing parameters based on sensing performed during at least a sensing period of a current time slot in a fixed contention based spectrum sharing system, the first transmission device sharing a spectrum with a second transmission device;
    determining, at a first artificial neural network of the first transmission device, at least one of a transmission device action or a transmission parameter in response to receiving the set of spectrum sharing parameters; and
    transmitting, from the first transmission device, to a first receiving device of a plurality of receiving devices during a data transmission phase of the current time slot based on the at least one of the transmission device action or the transmission parameter.

2. The method of clause 1, in which determining the at least one of the transmission device action or the transmission parameter comprises maximizing a reward aggregated across the first transmission device and the second transmission device based on a reward function of the first artificial neural network.
3. The method of clause 1 or 2, in which the reward comprises a served rate for each of the plurality of receiving devices served by the first transmission device and the second transmission device.
4. The method of any of the preceding clauses, further comprising training the reward function to maximize the reward.
5. The method of any of the preceding clauses, in which the set of spectrum sharing parameters comprise at least one of a total energy observed in sensing periods of a first set of previous time slots, an observed energy from each of a plurality of interferers in the current time slot, an interference measurement of a second set of previous time slots, a first mean rate for serving the first receiving device in a third set of previous time slots, a second mean rate for serving a second receiving device by the first transmission device in the third set of previous time slots, a third mean rate used by the second transmission device for serving a third receiving device, a drawn counter value, compressed information obtained from the third set of previous time slots, an estimated state of the second transmission device, or a combination thereof
6. The method of any of the preceding clauses, in which the first transmission device and the second transmission device execute a same artificial neural network.
7. The method of any of the preceding clauses, further comprising training the first artificial neural network according to an environment of the first transmission device, the first artificial neural network being different from a second artificial neural network of the second transmission device.
8. The method of any of the preceding clauses, in which:
the first artificial neural network shares at least one first layer with a second artificial neural network of the second transmission device; and
at least one second layer of the first artificial neural network is tuned for the first artificial neural network.
9. The method of any of the preceding clauses, in which:
the transmission device action comprises a determination to transmit to the first receiving device during the data transmission phase or a determination to refrain from transmitting to the first receiving device; and
the transmission parameter comprises at least one of an energy detection threshold for determining whether to transmit, a modulation and coding scheme (MCS), a transmission power, a precoding parameter, an identity of the second transmission device, an estimated state of the second transmission device, a value associated with each potential transmission device action, a mean value of all potential transmission device actions and a difference for each potential action.
10. The method of any of the preceding clauses, in which the first transmission device is a base station and the first receiving device is a user equipment (UE).
11. An apparatus for wireless communications performed by a first transmission device, comprising:
a processor,
memory coupled with the processor; and
instructions stored in the memory and operable, when executed by the processor, to cause the apparatus:
to determine, by the first transmission device, a set of spectrum sharing parameters based on sensing performed during at least a sensing period of a current time slot in a fixed contention based spectrum sharing system, the first transmission device sharing a spectrum with a second transmission device;
to determine, at a first artificial neural network of the first transmission device, at least one of a transmission device action or a transmission parameter in response to receiving the set of spectrum sharing parameters; and
to transmit, at the first transmission device, to a first receiving device of a plurality of receiving devices during a data transmission phase of the current time slot based on the at least one of the transmission device action or the transmission parameter.
12. The apparatus of clause 11, in which the processor causes the apparatus to determine the at least one of the transmission device action or the transmission parameter to maximize a reward aggregated across the first transmission device and the second transmission device based on a reward function of the first artificial neural network.
13. The apparatus of clause 11 or 12, in which the reward comprises a served rate for each of the plurality of receiving devices served by the first transmission device and the second transmission device.
14. The apparatus of any of the clauses 11-13, in which the processor causes the apparatus to train the reward function to maximize the reward.
15. The apparatus of any of the clauses 11-14, in which the set of spectrum sharing parameters comprise at least one of a total energy observed in sensing periods of a first set of previous time slots, an observed energy from each of a plurality of interferers in the current time slot, an interference measurement of a second set of previous time slots, a first mean rate for serving the first receiving device in a third set of previous time slots, a second mean rate for serving a second receiving device by the first transmission device in the third set of previous time slots, a third mean rate used by the second transmission device for serving a third receiving device, a drawn counter value, compressed information obtained from the third set of previous time slots, an estimated state of the second transmission device, or a combination thereof
16. The apparatus of any of the clauses 11-15, in which the first transmission device and the second transmission device comprise a same artificial neural network.
17. The apparatus of any of the clauses 11-16, in which the processor causes the apparatus to train the first artificial neural network according to an environment of the first transmission device, the first artificial neural network being different from a second artificial neural network of the second transmission device.
18. The apparatus of any of the clauses 11-17, in which:
the first artificial neural network shares at least one first layer with a second artificial neural network of the second transmission device; and
at least one second layer of the first artificial neural network is tuned for the first artificial neural network.
19. The apparatus of any of the clauses 11-18, in which:
the transmission device action comprises a determination to transmit to the first receiving device during the data transmission phase or a determination to refrain to transmit to the first receiving device; and the transmission parameter comprises at least one of an energy detection threshold to determine whether to transmit, a modulation and coding scheme, a transmission power, a precoding parameter, an identity of the second transmission device, an estimated state of the second transmission device, a value associated with each potential transmission device action, a mean value of all potential transmission device actions and a difference for each potential action.

20. The apparatus of any of the clauses 11-19, in which the first transmission device is a base station and the first receiving device is a user equipment (UE).

21. A first transmission device, comprising:

means for determining, by the first transmission device, a set of spectrum sharing parameters based on sensing performed during at least a sensing period of a current time slot in a fixed contention based spectrum sharing system, the first transmission device sharing a spectrum with a second transmission device;

means for determining, at a first artificial neural network of the first transmission device, at least one of a transmission device action or a transmission parameter in response to receiving the set of spectrum sharing parameters; and means for transmitting, from the first transmission device, to a first receiving device of a plurality of receiving devices during a data transmission phase of the current time slot based on the at least one of the transmission device action or the transmission parameter.

22. The first transmission device of clause 21, in which means for determining the at least one of the transmission device action or the transmission parameter comprises means for maximizing a reward aggregated across the first transmission device and the second transmission device based on a reward function of the first artificial neural network.

23. The first transmission device of clause 21 or 22, in which the reward comprises a served rate for each of the plurality of receiving devices served by the first transmission device and the second transmission device.

24. The first transmission device of any of the clauses 21-23, further comprising means for training the reward function to maximize the reward.

25. The first transmission device of any of the clauses 21-24, in which the set of spectrum sharing parameters comprise at least one of a total energy observed in sensing periods of a first set of previous time slots, an observed energy from each of a plurality of interferers in the current time slot, an interference measurement of a second set of previous time slots, a first mean rate for serving the first receiving device in a third set of previous time slots, a second mean rate for serving a second receiving device by the first transmission device in the third set of previous time slots, a third mean rate used by the second transmission device for serving a third receiving device, a drawn counter value, compressed information obtained from the third set of previous time slots, an estimated state of the second transmission device, or a combination thereof 26. The first transmission device of any of the clauses 21-25, in which the first transmission device and the second transmission device comprise a same artificial neural network.

27. The first transmission device of any of the clauses 21-26, further comprising means for training the first artificial neural network according to an environment of the first transmission device, the first artificial neural network being different from a second artificial neural network of the second transmission device.

28. The first transmission device of any of the clauses 21-27, in which:

the first artificial neural network shares at least one first layer with a second artificial neural network of the second transmission device; and at least one second layer of the first artificial neural network is tuned for the first artificial neural network.

29. The first transmission device of any of the clauses 21-28, in which:

the transmission device action comprises a determination to transmit to the first receiving device during the data transmission phase or a determination to refrain from transmitting to the first receiving device; and the transmission parameter comprises at least one of an energy detection threshold for determining whether to transmit, a modulation and coding scheme, a transmission power, a precoding parameter, an identity of the second transmission device, an estimated state of the second transmission device, a value associated with each potential transmission device action, a mean value of all potential transmission device actions and a difference for each potential action.

30. The first transmission device of any of the clauses 21-29, in which the first transmission device is a base station and the first receiving device is a user equipment (UE).

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first base station, comprising:
  determining, by the first base station device, a set of spectrum sharing parameters based on sensing performed during at least a sensing period of a current time slot in a fixed contention based spectrum sharing system, the first base station sharing a spectrum with a second base station;
  determining, at a first artificial neural network of the first base station, at least one of a base station action or a transmission parameter in response to receiving the set of spectrum sharing parameters, the determining comprising maximizing a reward function of the first artificial neural network based on a mean served rate for each of a plurality of receiving devices aggregated across a plurality of base stations, the mean served rate exchanged among the plurality of base stations; and
  transmitting, from the first base station, to a first receiving device of the plurality of receiving devices during a data transmission phase of the current time slot based on the at least one of the base station action or the transmission parameter.

2. The method of claim 1, further comprising training the reward function to maximize the reward.

3. The method of claim 1, in which the set of spectrum sharing parameters comprise at least one of a total energy observed in sensing periods of a first set of previous time slots, an observed energy from each of a plurality of interferers in the current time slot, an interference measurement of a second set of previous time slots, a first mean rate for serving the first receiving device in a third set of previous time slots, a second mean rate for serving a second receiving device by the first base station in the third set of previous time slots, a third mean rate used by the second base station for serving a third receiving device, a drawn counter value, compressed information obtained from the third set of previous time slots, an estimated state of the second base station, or a combination thereof.

4. The method of claim 1, in which the first base station and the second base station execute the first artificial neural network.

5. The method of claim 1, further comprising training the first artificial neural network according to an environment of the first base station, the first artificial neural network being different from a second artificial neural network of the second base station.

6. The method of claim 1, in which:
  the first artificial neural network shares at least one first layer with a second artificial neural network of the second base station; and
  at least one second layer of the first artificial neural network is tuned for the first artificial neural network.

7. The method of claim 1, in which:
  the base station action comprises a determination to transmit to the first receiving device during the data transmission phase or a determination to refrain from transmitting to the first receiving device; and
  the transmission parameter comprises at least one of an energy detection threshold for determining whether to transmit, a modulation and coding scheme (MCS), a transmission power, a precoding parameter, an identity of the second base station, an estimated state of the second base station, a value associated with each potential base station action, a mean value of all potential base station actions and a difference for each potential action.

8. The method of claim 1, in which the first receiving device is a user equipment (UE).

9. An apparatus for wireless communications performed by a first base station, comprising:
  at least one processor,
  at least one memory coupled with the at least one processor; and
  instructions stored in the at least one memory and operable, when executed by the at least one processor, to cause the apparatus:
    to determine, by the first base station, a set of spectrum sharing parameters based on sensing performed during at least a sensing period of a current time slot in a fixed contention based spectrum sharing system, the first base station sharing a spectrum with a second base station;
    to determine, at a first artificial neural network of the first base station, at least one of a base station action or a transmission parameter in response to receiving the set of spectrum sharing parameters, the determining comprising maximizing a reward function of the first artificial neural network based on a mean served rate for each of a plurality of receiving devices aggregated across a plurality of base stations, the mean served rate exchanged among the plurality of base stations; and
    to transmit, at the first base station, to a first receiving device of a plurality of receiving devices during a data transmission phase of the current time slot based on the at least one of the base station action or the transmission parameter.

10. The apparatus of claim 9, in which the at least one processor causes the apparatus to train the reward function to maximize the reward.

11. The apparatus of claim 9, in which the set of spectrum sharing parameters comprise at least one of a total energy observed in sensing periods of a first set of previous time slots, an observed energy from each of a plurality of interferers in the current time slot, an interference measurement of a second set of previous time slots, a first mean rate for serving the first receiving device in a third set of previous time slots, a second mean rate for serving a second receiving device by the first base station in the third set of previous time slots, a third mean rate used by the second base station for serving a third receiving device, a drawn counter value, compressed information obtained from the third set of previous time slots, an estimated state of the second base station, or a combination thereof.

12. The apparatus of claim 9, in which the first base station and the second base station comprise the first artificial neural network.

13. The apparatus of claim 9, in which the at least one processor causes the apparatus to train the first artificial neural network according to an environment of the first base station, the first artificial neural network being different from a second artificial neural network of the second base station.

14. The apparatus of claim 9, in which:
the first artificial neural network shares at least one first layer with a second artificial neural network of the second base station; and
at least one second layer of the first artificial neural network is tuned for the first artificial neural network.

15. The apparatus of claim 9, in which:
the base station action comprises a determination to transmit to the first receiving device during the data transmission phase or a determination to refrain to transmit to the first receiving device; and
the transmission parameter comprises at least one of an energy detection threshold to determine whether to transmit, a modulation and coding scheme, a transmission power, a precoding parameter, an identity of the second base station, an estimated state of the second base station, a value associated with each potential base station action, a mean value of all potential base station actions and a difference for each potential action.

16. The apparatus of claim 9, in which the first receiving device is a user equipment (UE).

17. A first base station, comprising:
means for determining, by the first base station, a set of spectrum sharing parameters based on sensing performed during at least a sensing period of a current time slot in a fixed contention based spectrum sharing system, the first base station sharing a spectrum with a second base station;
means for determining, at a first artificial neural network of the first base station, at least one of a base station action or a transmission parameter in response to receiving the set of spectrum sharing parameters, the means for determining comprising means for maximizing a reward function of the first artificial neural network based on a mean served rate for each of a plurality of receiving devices aggregated across a plurality of base stations, the mean served rate exchanged among the plurality of base stations; and
means for transmitting, from the first base station, to a first receiving device of a plurality of receiving devices during a data transmission phase of the current time slot based on the at least one of the base station action or the transmission parameter.

18. The first base station of claim 17, further comprising means for training the reward function to maximize the reward.

19. The first base station of claim 17, in which the set of spectrum sharing parameters comprise at least one of a total energy observed in sensing periods of a first set of previous time slots, an observed energy from each of a plurality of interferers in the current time slot, an interference measurement of a second set of previous time slots, a first mean rate for serving the first receiving device in a third set of previous time slots, a second mean rate for serving a second receiving device by the first base station in the third set of previous time slots, a third mean rate used by the second base station for serving a third receiving device, a drawn counter value, compressed information obtained from the third set of previous time slots, an estimated state of the second base station, or a combination thereof.

20. The first base station of claim 17, in which the first base station and the second base station comprise the first artificial neural network.

21. The first base station of claim 17, further comprising means for training the first artificial neural network according to an environment of the first base station, the first artificial neural network being different from a second artificial neural network of the second base station.

22. The first base station of claim 17, in which:
the first artificial neural network shares at least one first layer with a second artificial neural network of the second base station; and
at least one second layer of the first artificial neural network is tuned for the first artificial neural network.

23. The first base station of claim 17, in which:
the base station action comprises a determination to transmit to the first receiving device during the data transmission phase or a determination to refrain from transmitting to the first receiving device; and
the transmission parameter comprises at least one of an energy detection threshold for determining whether to transmit, a modulation and coding scheme, a transmission power, a precoding parameter, an identity of the second base station, an estimated state of the second base station, a value associated with each potential base station action, a mean value of all potential base station actions and a difference for each potential action.

24. The first base station of claim 17, in which the first receiving device is a user equipment (UE).

* * * * *